United States Patent [19]

Furuholt et al.

[11] Patent Number: 4,696,453
[45] Date of Patent: Sep. 29, 1987

[54] COUPLING DEVICE FOR SUBMARINE PIPELINE SYSTEM

[75] Inventors: Edgar Furuholt, Trondheim; Anders M. Liaaen, Alesund, both of Norway

[73] Assignees: Den norske stats oljeselskap a.s.; Liaaen Industrier A/S, both of Norway

[21] Appl. No.: 852,347

[22] Filed: Apr. 15, 1986

[30] Foreign Application Priority Data

Apr. 19, 1985 [NO] Norway .................................. 851569

[51] Int. Cl.$^4$ .............................................. F16L 37/28
[52] U.S. Cl. .................................. 251/149.6; 285/96; 285/137.2; 285/920
[58] Field of Search ........................ 251/149.1, 149.6; 285/137.2, 96, 316, 920

[56] References Cited

U.S. PATENT DOCUMENTS

| 2,761,703 | 9/1956 | Olwin | 285/326 |
| 2,885,005 | 5/1959 | Rhodes | 285/137.2 |
| 3,053,553 | 9/1962 | Browning | 285/31 |
| 3,127,197 | 3/1964 | Kretzschmar | 285/137.2 |
| 3,693,714 | 9/1972 | Baugh | 285/137.2 |
| 4,070,045 | 1/1978 | Colter et al. | 285/325 |
| 4,087,119 | 5/1978 | Capdebosc et al. | 285/18 |
| 4,200,312 | 4/1980 | Watkins | 285/137.2 |
| 4,229,027 | 10/1980 | Morrill | 285/137.2 |
| 4,262,748 | 4/1981 | Kirkland | 285/137.2 |
| 4,453,566 | 6/1984 | Henderson, Jr. et al. | 285/137.2 |

FOREIGN PATENT DOCUMENTS

| 136380 | 10/1975 | Norway . |
| 2033463 | 5/1980 | United Kingdom . |
| 2103745 | 2/1983 | United Kingdom . |

Primary Examiner—A. Michael Chambers
Attorney, Agent, or Firm—Lucas & Just

[57] ABSTRACT

A demountable coupling device for submarine pipeline sections (33,34,35) where one or a plurality of conduits can be connected together on the seabed by a remotely controlled operation without the use of divers or guidewires. The connection of the pipeline sections, which are provided with square flanges (2), takes place by a vertical movement of the coupling unit (1) of the coupling device, which is provided with a groove (1') at each of its ends, the grooves being adapted for reception of the largely vertical portions of the pipeline flanges (2) when in an operating position on the seabed. The casing (1) of the coupling unit contains all components which are necessary for the connections. Once the C-shaped groove of the coupling unit are engaged by the pipeline flanges (2), connection takes place by moving the telescopically displaceable connecting tubes of the casing into corresponding bushings in the respective conduits of the pipeline flanges (2), in that a sealing system ensures effective seal tightening. The coupling operation is reversible, and mounting can take place independent of the order of the demounting. To achieve a prestressing of the respective pipeline flanges against the coupling unit, prestressing devices are placed in the casing of the coupling (1). The coupling is secured by means of a locking mechanism.

8 Claims, 11 Drawing Figures

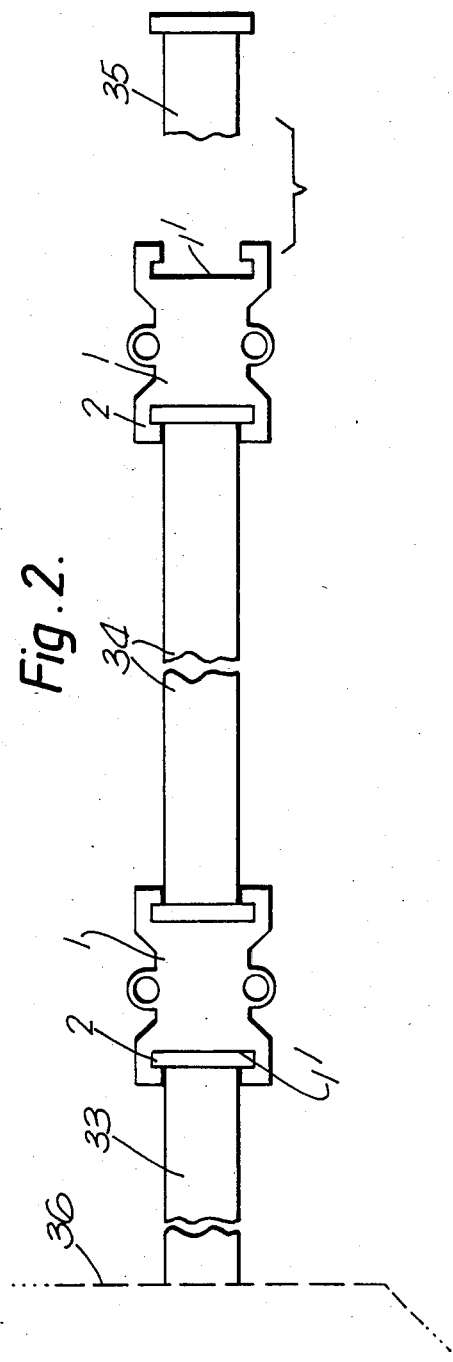
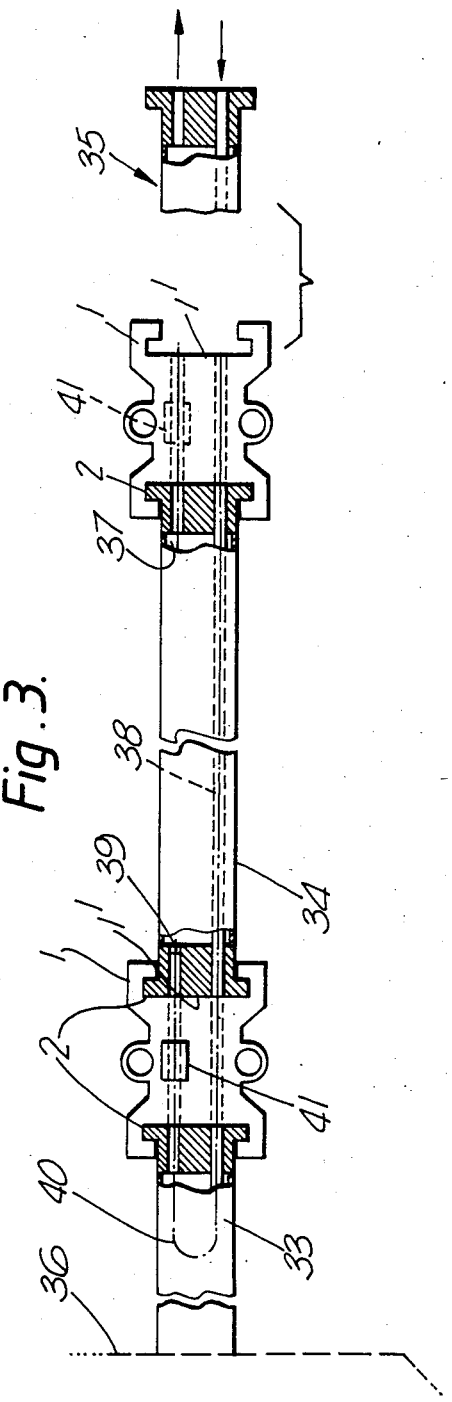
Fig. 2.
Fig. 3.

COUPLING DEVICE FOR SUBMARINE PIPELINE SYSTEM

This invention relates to a demountable coupling for submarine pipeline systems and more particular to a device permitting a releasable connection of pipeline sections with one or several conduits (sections of pipeline bundles), connection of pipeline sections and a valve or a wellhead, and moreover of the character expressed in the preamble of claim 1.

The experience from the oil activity offshore together with research and development have gradually made possible the economic exploitation of many of the present marginal oil and gas fields, which have been discovered beneath the seabed.

This has been an incentive for the development that has taken place within the technical field, which for one thing includes the laying of the pipelines in deep water.

Laying of pipeline bundles and connecting these should be reversible, making a replacement of whichever section of pipeline bundle possible at any time such a replacement is needed. The coupling should be designed and arranged to permit mounting and demounting without actual displacement of the ends of the pipeline bundles being necessary. The joining operation at the seabed should take place without the use of guide-wires or divers. The requirements for such a demountable coupling includes amongst other things that the mechanical stability of the joints should be at least as large as in the pipeline bundle elsewhere. Connection should take place by means of hydraulics. The flanges of the sections of the pipeline should be prestressed against the coupling. The joint between the tube flanges and the coupling should be mechanically locked, whereby the hydraulic prestressing pressure can be suspended after connection has been established. Demounting should be carried out in a controlled way, and the end flanges of the sections of the pipeline bundle should remain intact and unharmed after demounting. The respective conduits of two adjoining sections of pipeline bundles should be connected leak tight via corresponding conduits in the coupling units.

Providing demountable coupling unit complying with these requirements in this way represents a qualified technical problem.

In accordance with the present invention there is provided a demountable coupling unit of the preliminary stated art, which in addition to fulfilling said demands, leads to several other advantages. For these and other objects, which will become evident from the following description, the invention is characterized by the features which are defined in more detail in the following claims.

The pipeline sections etc. (valves, wellhead, and so on) which are to be connected together, are connected with end flanges having two oppositely positioned parallel plane side surfaces, which runs at least approximately vertical once the pipeline sections have been situated in an operative position. According to the invention advantage is taken of the fact that the plane of the pipeline flanges being approximately vertical, in that the preliminary connection operations between for instance a pipeline section on the seabed and the coupling device is made by an exclusively vertically downward movement of the coupling device, which includes a coupling unit whose casing at each of its two axial end portions is designed with continuous grooves dimensioned in order to receive the vertical flange portions. The connecting of the pipe end portions thus takes place by a purely vertical movement without horizontal towing in. The casing of the coupling contains hydraulically actuated axially moveable connection tubes for leak tight joining to the conduits of the pipeline sections (in reality via linings). The casing of the coupling moreover includes hydraulic tensioning devices. These are operative only during the coupling and decoupling operations, as a releasable mechanical locking device in the casing of the coupling is arranged to step into function after connection is established, in order to secure the locking-function in a connected state while maintaining the tension of the tube flange against the coupling which is achieved hydraulically. The locking and latching of the connecting tubes with the conduits can be released on demounting when the need arises to replace a pipeline section etc. The coupling operation is thus reversible, and mounting can take place independent of the chosen order of demounting. The coupling device according to the invention distinguishes itself by comprising one singular coupling unit in which all hydraulic and mechanic components are built into the device. Mounting and demounting operations are adopted for remote control and make the use of divers and guide-wires superfluous. These operations may thus take place even at depths where the use of divers is inapplicable. For the connection of sections of pipeline bundles, each of which comprising a plurality of conduits arranged in an external casing, each of these coaxial, axially moveable connecting tubes (telescopic tubes), which in number and size correspond to the conduits in the said sections of the pipeline bundles, located in the casing on each flange-side can preferably be provided with a common hydraulic servo-piston. Thereby the connecting tubes of the respective flange side can be moved synchronously and received by the corresponding conduits at the respective axial end of the casing.

The casing can preferably include four tensioning wedges, two for each flenge side. Each tensioning wedge can have the shape of a cylindric wedge, which by hydraulic action is arranged to be pulled along a rectangular wedge. When the desired tensioning of the tube flange against the coupling is achieved, the hydraulic pressure can be suspended, as the wedge mechanism is of a selflocking type.

Other features and advantages of the invention will be evident from the following description of preferable embodiments which represents illustrative, nonlimiting examples on constructive aspects of the invention, its function and its use, with reference to the accompanying drawings, where:

FIG. 2 shows a schematical outline in the plane from above of sections of pipeline bundles being connected by means of the coupling according to the invention;

FIG. 3 shows an outline in the plane according to FIG. 2, portions of which are shown in horizontal cross section, showing the internal structure;

Figure 1:
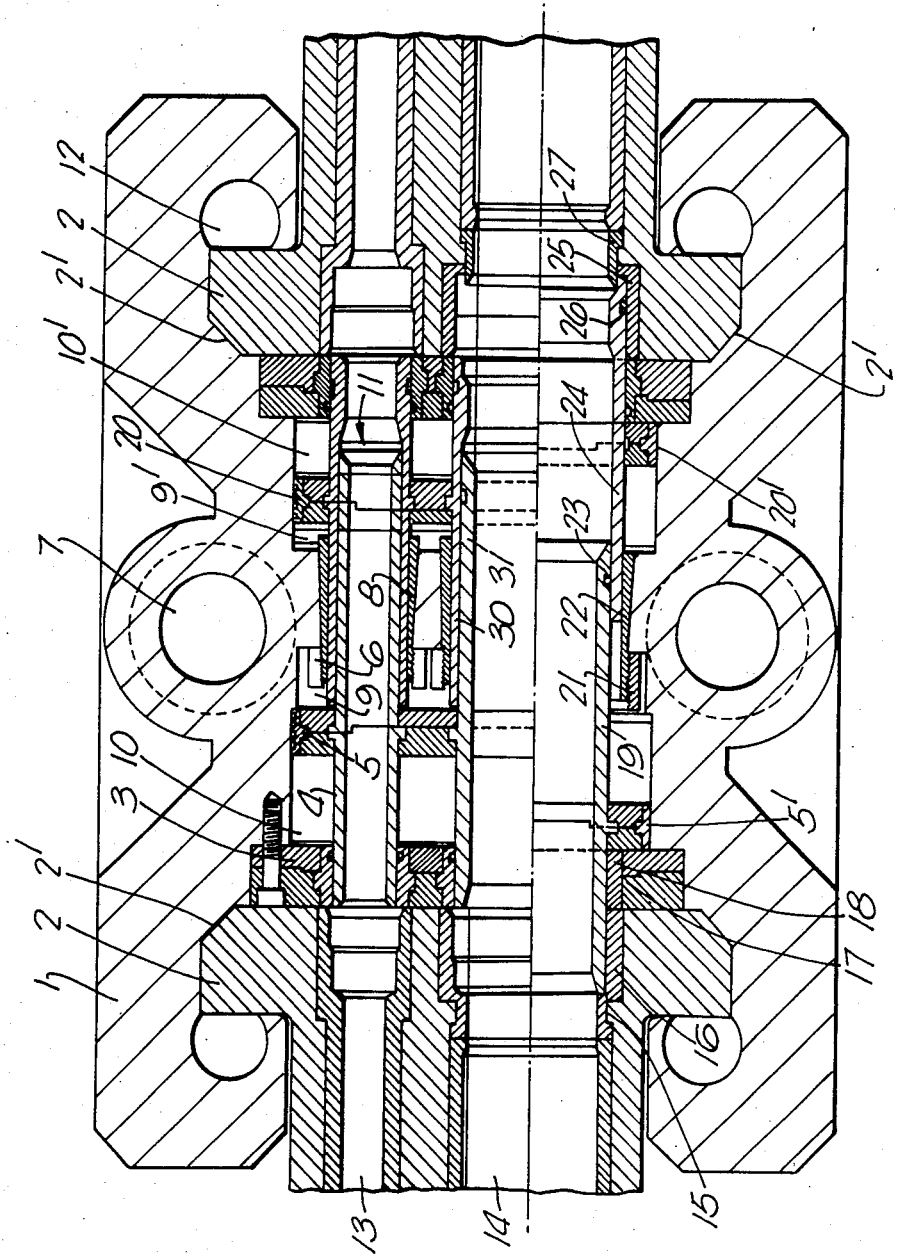
FIG. 1 shows an axial section through a coupling according to the invention being connected to sections of pipeline bundles at each end.

In FIG. 1, which shows an axtial section through the coupling according to the invention with sections of pipeline bundles being connected to each of its axtial end portions, 1 designates the casing of the coupling, and 2 designates a square end flange at each section of the pipeline bundle. Each end flange 2 have two oppositely situated, parallel sidesurfaces which in an operative position of the sections of the pipeline bundles on the seabed are running at least approximately vertically. In the embodiment shown each of the end flanges has a bevel 2'. According to FIGS. 1, 2 and 3 each end flange is received by a correspondingly formed groove 1' running through the coupling unit with an approximately right angled C-shaped cross section (see FIGS. 2 and 3). The number designates the bottom of a cylinder divided in two in the casing of the coupling unit, while 4 designates an internal axially displaceable connecting tube in the casing, intended for connecting of service tubes. A common hydraulic servo piston 5 is mounted as shown in the two positions 5 and 5' for connecting the axially displaceable connecting tubes in the casing 1 together with the conduits in the flange 2 of the left section of the pipeline bundle according to FIG. 1. 6 moreover designates a pulling tool and 7 a connection for controlling the handling, while 8 indicates a conical sleeve or a sealing ring between axially displaceable connecting tubes (telescopic tubes). The casing 1 further incorporates hydraulic oil chaxers 9 and 9' for coupling and two hydraulic oil chambers 10 and 10' for decoupling.

Sections of pipeline bundles and coupling units are mounted consecutively by mounting coupling units to the flange of the pipeline bundle, after which the flange of the next pipeline bundle is mounted to the same coupling unit and so forth (see FIGS. 2 and 3).

Once the coupling unit is mounted by remote control to the flange 2 of the pipeline bundle at left on FIG. 1 and is brought into a correct position, the pressure medium of the oil chamber 9 is activated. Because of the common servo-piston 5 all joining or connecting tubes in the casing 1 are thereby simultaneously moved into their respective conduits in the flange of the left pipeline bundle.

The axially displaceable connecting tubes (telescopic tubes, pushing tubes), including the internal connecting tube for joining of service tubes, are thereby pressed into their respective bushings in the flange 2 of the pipeline bundle. The forward edge of the connecting tubes is chamfered to ensure adjustment of the tubes being joined.

In FIG. 1 the number 11 designates an external axially displaceable connecting tube for joining of service tubes. 12 indicates a prestressing device comprising four wedges, two on each flange side. This prestressing device will be described in more detail later. 13 and 14 designate respectively the service tube and the production line in the flange 2 of the left pipeline bundle. 15 indicates a sleeve in the flange 2 of the pipeline bundle. The numbers 16, 17 and 18 designate respectively a bushing, a flexible guiding device and a sealing ring, all of which intended for the axially displaceable connecting tubes, including the internal connecting tube 4 for connection to the service tube 13 and an internal connecting tube 19 for connection to the production pipeline 14 in the flange 2 of the left pipeline bundle. The connecting tubes 4, 19 are provided with seals which during connection will be pressed against the force fits in the flange bushings 16. Thereby an effective seal is achieved for the respective tube connections. This operation is followed by prestressing the tube flange 2 against the casing 1 by means of the wedge devices 12, which will be explained in more detail below, on each side of the respective flanges 2 of the pipeline bundle.

In addition to incorporating all means regarding the joining of each one of every tube connection, the casing 1 will also constitute the power transmitting link between the adjoining pipeline bundles. The rigidity of the pipeline bundle depends upon the ability of the external pipe to absorb tensive-and bending loads.

The coupling comprises a part of the pipeline system and must therefore be able to tolerate the loads which the rest of the pipeline bundle is subjected to.

Once a tight connection is established between the conduits or each side of the coupling unit, the flanges 2 of the pipeline bundle will have to be prestressed against the coupling unit.

The prestressing device comprises according to the embodiment shown in FIG. 1 four prestressing wedges 12, two on each side flange and each in the form of a cylindric wedge resting against the adjacent flange surface of the pipeline bundle and arranged to be pulled along a rectangular wedge by means of hydraulic force. The wedge device is selflocking, allowing the hydraulic pressure to be suspended once the desired prestressing of the flange of the pipeline bundle against the coupling unit is achieved. This prestressing ensures that the flange 2 of the pipeline bundle remains in its position in relation to the casing 1.

The joining of each of the conduits takes place by displacing the bushings in the casing 1 into the respective conduits 30, 14 in the flange 2 of the pipeline bundle. The bushings are moved by means of hydraulic pressure. As already mentioned, all the bushings (connecting tube 4,19) are secured in a common servo piston 5, having the shape of a hydraulic pressure piston, on each side of the coupling. The piston 5 is an assembly of two plates which are bolted together. The displaceable bushings are provided ith collars between the piston plates. The bushing is thereby locked axially to the servo piston 5 in a simple and secure way.

Coupling (displacement of the connecting tube-bushings) takes place by the application of hydraulic pressure on the rear side of the piston 5 in the hydraulic on chamber 9. The servo piston 5 will thereby move together with all the tube bushings 4,19 in the left direction in FIG. 1, thus enabling the bushings to be moved towards and pressed into their respective sleeves 16 in the flange 2 of the adjoining pipeline bundle. Once the piston 5 has arrived at its extreme end position 5', all of the tube connections have been joined. The oil pressure behind piston 5 nay now be suspended and the piston with its connecting tubes 4,19 will remain in this position due to a mechanical locking device, which will be described in more detail in the following by reference to FIG. 4. In the meantime it will suffice to say that this locking device is not activated before both flange sides are connected.

By means of the connecting tool the next flange 2, at the right of FIG. 1, is placed in position, and connecting takes place according to the procedure described above by pressing the axially displaceable connecting tubes (telescopic tubes) in the casing 1 into their respective tube sockets in the flange 2 of the pipeline bundle by means of a common hydraulic piston 20 shown in two positions, 20 and 20'.

In FIG. 1 the number 21 designates moreover a lock nut for a conical sleeve, which will be described in more detail later on. This conical sleeve for the sealing ring between the axially displaceable connecting tubes for the production pipeline 14 is designated by 22. 23 indicates a sealing ring between the internal 19 and external 24 telescopically displaceable connecting tubes in the house 1 of the coupling. Sealing between an external connection tube 24 and a bushing 25 in the right flange 2 according to FIG. 1 takes place by compressing a special sealing ring 26 at the end of the connecting tube 24 caused by the bushing 25 having a lesser diameter. This is in principle the same for both flanges.

To achieve the necessary pressure on the sealing ring 23 between the internal 19 and the external 24 axially displaceable connection tube, there is, according to the invention, employed a special device which will be described in more detail in connection with FIG. 6–8.

The telescopically displaceable connection tubes, including the external connecting tube 24 for connection to the production pipeline on the right side according to FIG. 1, are correspondingly provided with a common servo piston 20 in the same way as the connecting tubes 4,19 on the left side according to FIG. 1, and are connected to their respective conduits in the flange 2 of the right pipeline bundle in a way corresponding to the one described for the connecting tubes 4,19 at the left flange of the pipeline bundle. Number 27 designates a sleeve in the right flange 2 of the pipeline bundle.

A schematical section in the plane is shown of the sections 33, 34 and 35 of the pipeline bundles being connected by means of the coupling devices according to the invention. The number 36 here indicates a wellhead being connected to the section 33 of the pipeline bundle.

By means of this pipeline system (pipeline bundles with coupling units) it is possible to control and regulate the composition of the fluid in the void 37, see FIG. 3, between the conduits in the pipeline bundle and the external casing 33, 34, 35. In the period between the fabrication to the laying of the pipeline bundle it is desired to employ this void 37 for buoyancy of the pipeline bundle and to take advantage of this ability for storing, transport and handling. The chamber 37 is therefore filled with gas until, after installation on the seabed, it is considered suitable to fill the chamber 37 with water or seawater having an inhibitor effect on the surfaces in contact with the inhibitor fluid. To achieve this a conduit 38 is arranged through the whole pipeline bundle for supplying of inhibitor fluid from the starting point, i.e. the wellhead 36 in FIG. 3. A conduit for return, aeration and control is provided for by means of a hole in each pipe-flange 2. The conduit is closed during installation with a releasable plug 39. The device will be effected by the movement of the servo piston 5,20 when mounting the coupling unit, whereby the plug 39 will be released and pushed into the casing chamber 37. The flange 2 on the wellhead 36 is provided with an open connecting loop 40 between the conduits a and b. During mounting of the coupling unit 1 the B-conduit will be closed. An inhibitor valve 41 is arranged not to be opened automatically before the next pipeline bundle 34 is connected to the coupling unit 1.

During installation of pipeline bundle and coupling units it may be suitable to let the pipeline bundles sink to the bottom one by one as the installation takes place. After installation of a coupling unit 1 water may be filled into the last pipeline bundle by opening the inhibitor valve 41.

Figure 5:
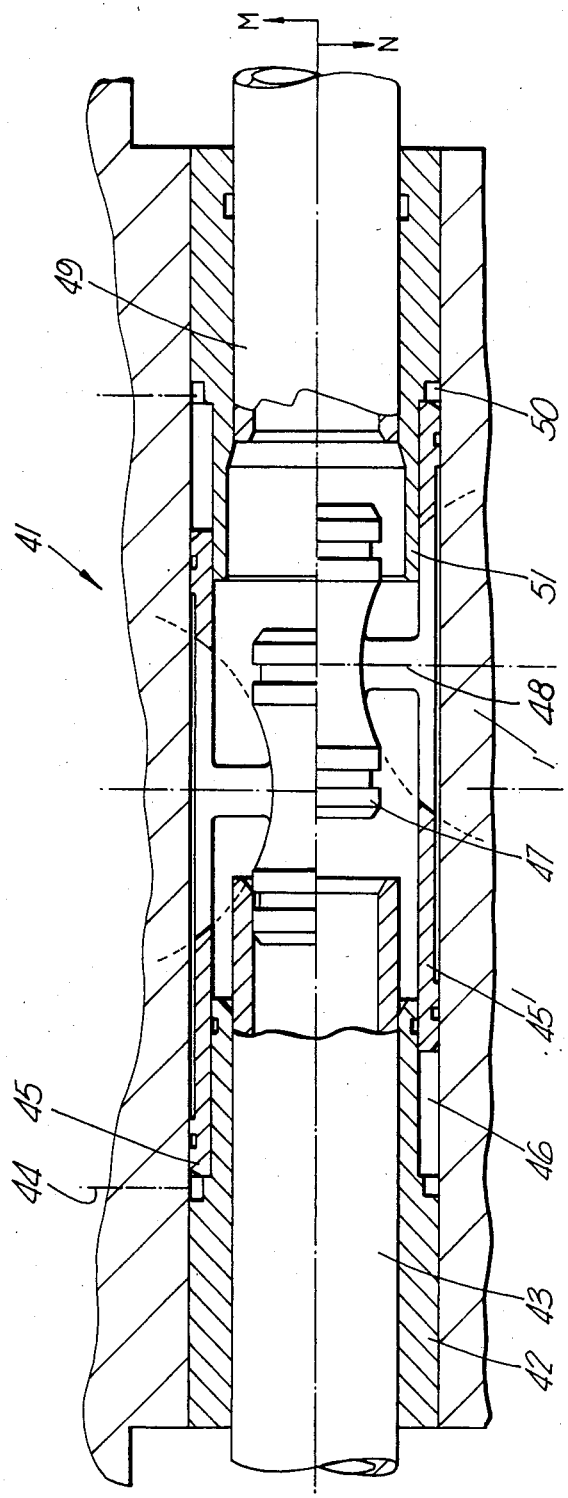
FIG. 5 illustrates in two angularly displaced axial sections a hydraulic guiding device for a so called inhibitor valve, which may be employed in combination with the coupling according to the invention.

FIG. 5 is a sketch showing the principle of the hydraulic operation of such an inhibitor valve 41. In FIG. 5 42 designates a bushing in the casing 1 for the control conduit or the inhibitor fluid, and 43 indicates a pushing tube for the return conduit. 44 designates the pressure conduit for opening of the inhibitor valve 41. 45 and 45' designate the piston of the inhibitor valve shown in two different positions, respectively in a closed and in an open position. 46 indicates the hydraulic cylinder of the inhibitor valve. The piston 45 is fitted with a sealing element 47 for the return conduit/the inhibitor fluid. 48 is a passage in the inhibitor valve 41 and 49 is a pushing tube for the return conduit in a connected position, corresponding to the pushing tube 43. 50 is an annular cylinder for closing of the inhibitor valve 41, and 51 is a bushing in the casing 1 for the control conduit/the inhibitor fluid. From the projection M it is apparent that the inhibitor valve is closed when only one pipeline bundle 33 is connected to the coupling unit 1. The sealing element 47 is enclosed by the pushing tube 43. When it is desired to let the fluid flow through the valve, pressure oil is conveyed through the pressure conduit 44. Thereby the piston 45 will be pushed to the position 45', see projection M. In this position the inhibitor valve 41 is open. Sea water can now via the coupling unit 1 flow into the pipeline bundle.

Once the pipeline sections have been installed, one has according to this arrangement an opportunity to inject new fluid having inhibitory effects into the pipeline bundle to protect this against corrosion. The return conduit may be used for analysis and control of the fluid content. The fluid being pumped into the pipeline bundles may be seawater with corrosion inhibiting additives.

Figure 6:
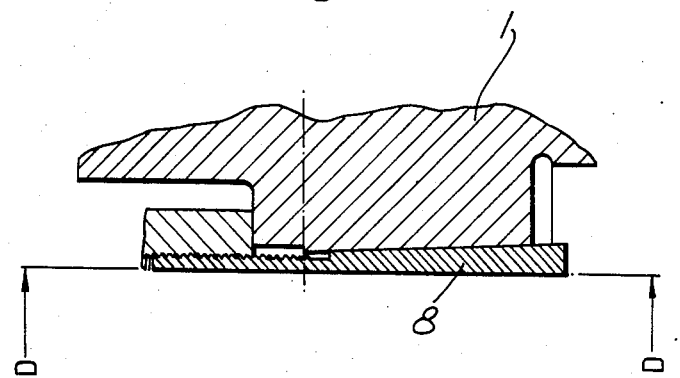
FIG. 6-8 shows partly in axial section three steps in the mounting operation for the coupling according to the invention.
Figure 7:
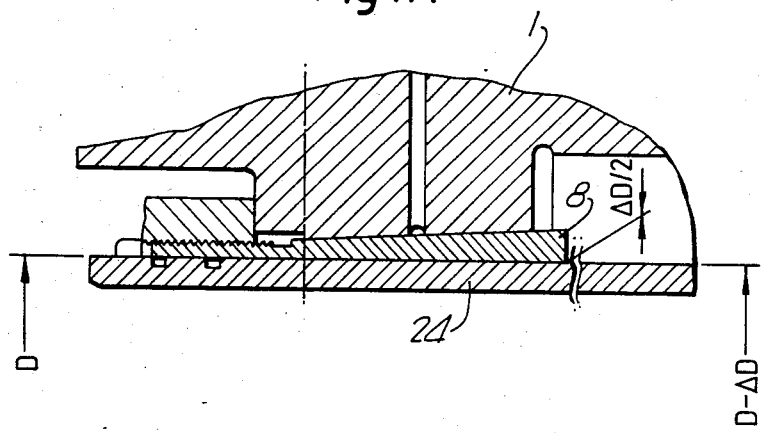
Figure 8:
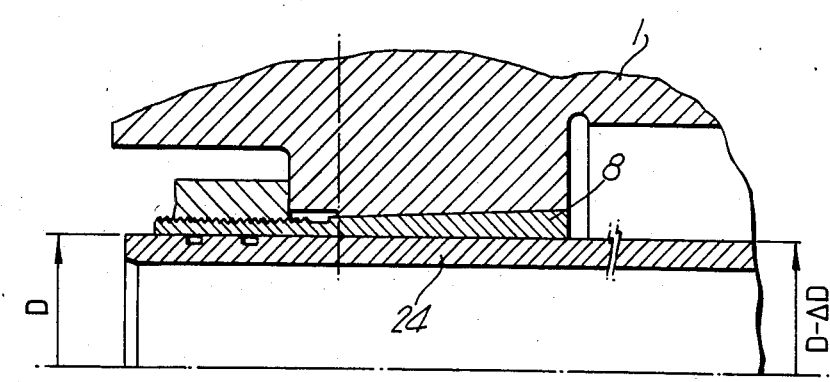

Reference is now made to FIG. 6–8.

Figure 11:
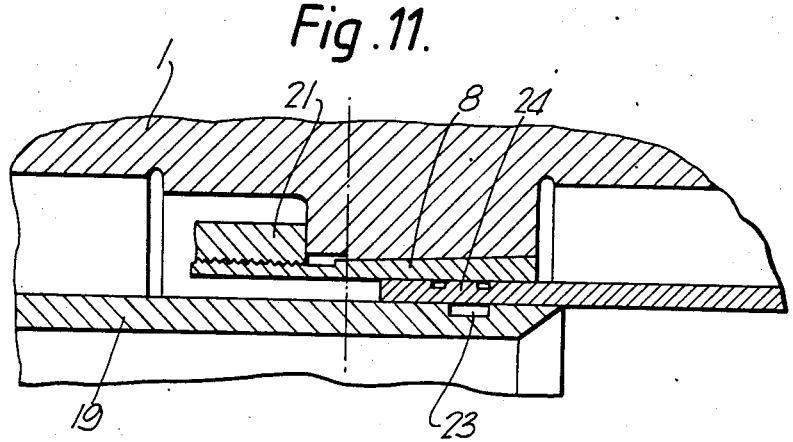

To achieve the necessary pressure on the sealing ring 23 (see FIG. 11) between the internal and the external telescopic connecting tubes, 19 respectively 24, the assembling of the coupling unit 1 is carried out as follows in the workshop:

First the conical sleeve 8 is inserted (FIG. 6). Before this is pulled on place, the connecting tube 24 is inserted as shown in FIG. 7. This telescopically displaceable connecting tube 24 has its perimeter reduced to a diameter D—D by lathing except in the sealing portion. Thereby the conical sleeve 8 can be pulled up by means of a hydraulic nut simultaneously with compressing the conical sleeve by the oil pressure created by a high pressure injection pump on the external surface of the cone (the so called SKF principle). When this operation is terminated, the situation is as shown in FIG. 8. Due to the lathing of the outer portion of the telescopically displaceable connecting tube 24, the internal diameter of the tube is unaffected by the conical sleeve now having a reduced internal diameter (D—D). The hydraulic nut is now replaced by a common lock nut. In the portion beneath the locking nut the conical bushing and the connecting tube 24 both have the same diameter as before insertion.

Figure 9:
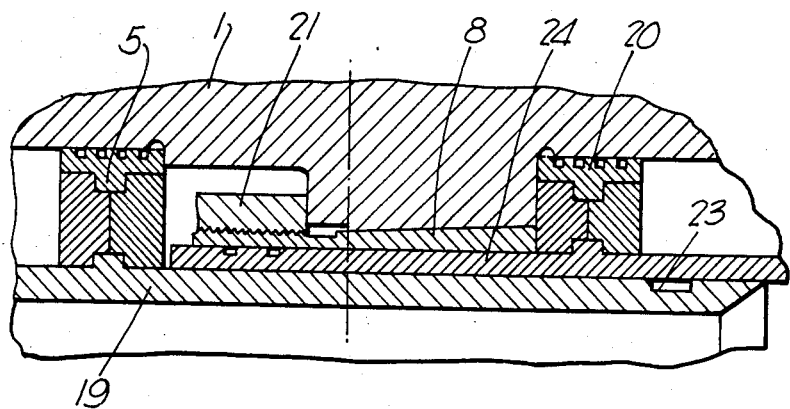
FIG. 9-11 shows partly in axial section three steps of the axial displacement operation of the connecting tubes in the casing of the coupling, in that these in the position shown in FIG. 11 are received by the corresponding conduits at each flange side.

One may also insert the connecting tubes and the piston from the other side of the coupling, as shown by FIG. 9. The connecting tasks 19 are inserted by application of suction. The diameter of a portion of the connecting tube 19 is reduced on each side of the ring seal 23 ($D_1$—D).

As shown in FIG. 9, the coupling is ready for use.

Figure 10:
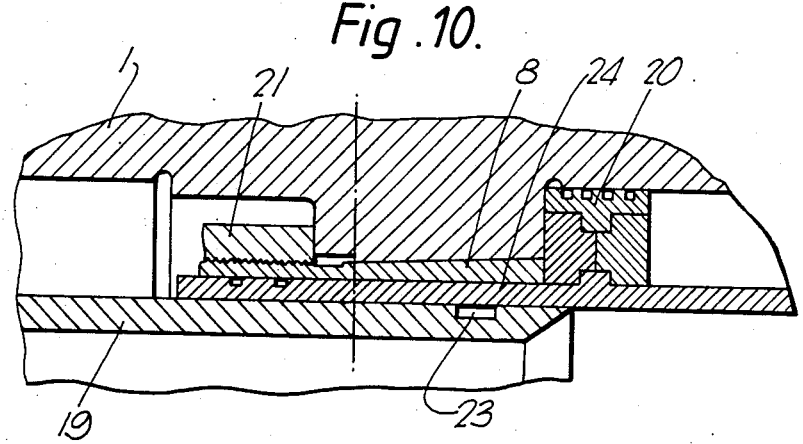

The first coupling takes place by finishing the coupling portion with the connecting tube 19, whereby the situation according to FIG. 10 arises.

When now the other portion is being coupled, the connecting tube 24 will due to the axial movement be forced into the conical sleeve 8, whose internal diameter now is reduced by D. The connecting tube 24 will thereby become compressed, and the internal periphery of the tube will exert a pressure against the ring seal 23 whereby an effective sealing is achieved. When both portions of the coupling unit are connected to its respective tube flanges 2, the servo piston 5 respectively 20 will in this way be located in its extreme position.

Figure 4:
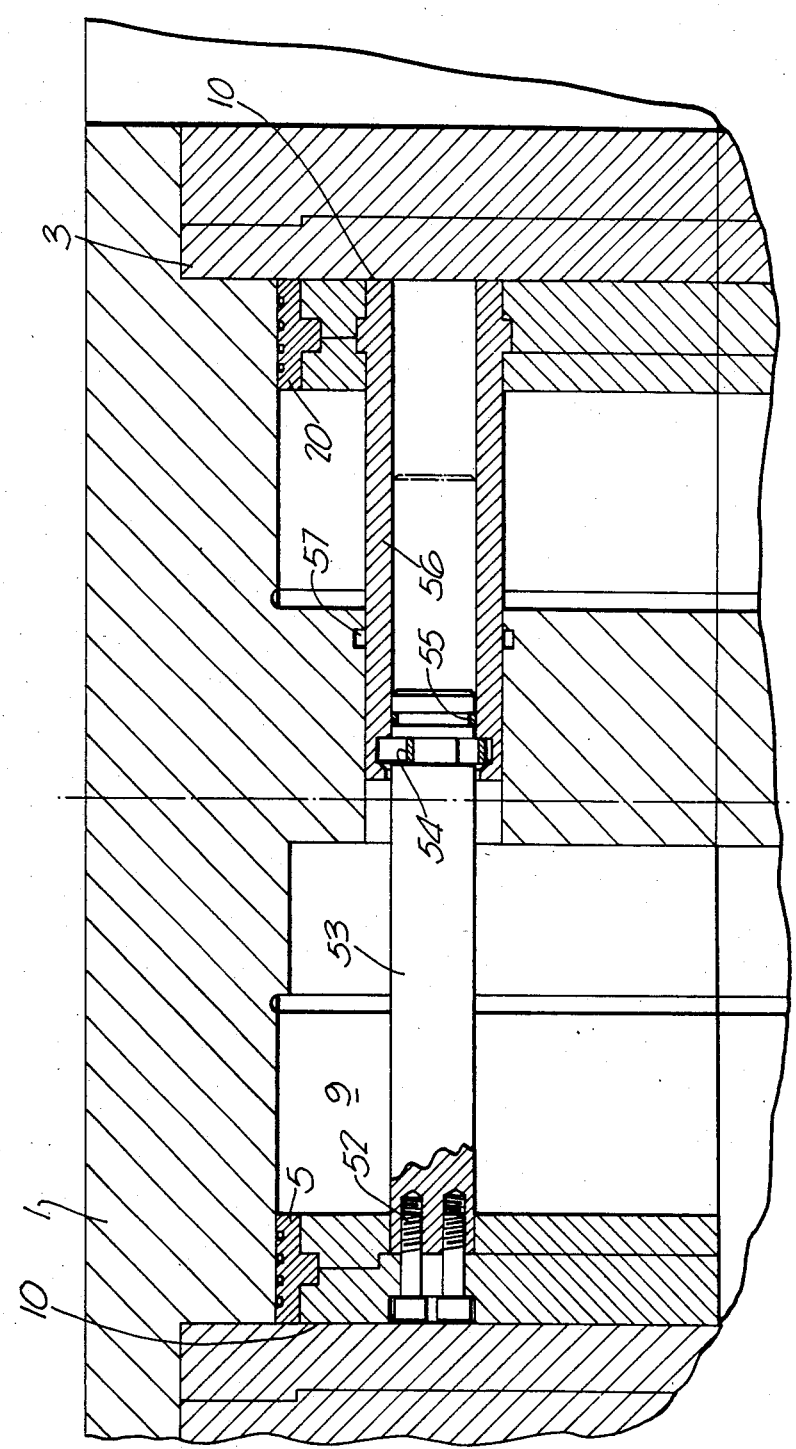
FIG. 4 shows part of FIG. 1 in a larger scale to show a mechanical locking device, the function of which is to keep the pipeline connections in a connected state after suspension of the hydraulic pressure.

At this point the mechanical locking device in FIG. 4 has also arrived at its outer position. This locking device includes a securing device 52 for a locking rod 53 which in a groove receives a locking ring 54. This locking ring is freely moveable in the direction transversal to that of the rod axis. 55 indicates a ring seal between the locking rod 53 and a locking tube 56. This is fitted with a groove which cooperates with the groove in the rod 53 and with a locking ring 54, such as when the locking device according to FIG. 4 has arrived in its outer position mentioned above, the locking ring 54 will fall into its groove in the locking rode 53 and down to said groove of the locking tube 56. The locking ring 54, which possibly may be replaced by a locking bar, will thereby block any returnal movement, and the telescopically displaceable connecting tube will remain in a locked position. This locking device is not engaged before both flange portions are connected. 57 indicates a sealing ring between locking tube 56 and casing 1. The mechanical locking by means of the locking device according to FIG. 4 can only be suspended by increasing the pressure from the uncoupling side 10 of the pistons 5 or 20 until the locking ring 54 is cut off.

We claim:

1. A releasable coupling unit for a subsea pipeline system, said coupling unit adapted for joining adjacent ends of two adjacent pipeline sectons of said subsea Pipeline system, each adjacent end of said adjacent pipeline sections having an end flange and each said adjacent pipeline sections having at least one conduit running therethrough, said coupling unit comprising:
   (a) a casing having two through running grooves, one groove positioned at one end of said casing, the other groove positioned at the other end of said casing, each said groove adapted to fit one end flange;
   (b) prestressing means for releasably locking said end flanges when said end flanges are in said through running grooves, said prestressing means positioned adjacent to said through running grooves in said casing;
   (c) axially displaceable connecting tubes mounted in said casing for joining said conduit of said adjacent pipeline sections when said end flanges are positioned in said through running grooves;
   (d) locking device mounted in said casing for releasably locking said connecting tubes in place when said connecting tubes have been axially displaced thereby joining the conduit of adjacent pipeline sections and coupling said adjacent pipeline sections.

2. The coupling unit of claim 1 wherein one of said adjacent pipeline sections is a valve, wellhead, or other similar section of a subsea pipeline system.

3. The coupling unit of claim 1 wherein said through running grooves have a general cross-section shape similar to a right-angle, C-shaped opening.

4. The coupling unit of claim 1 wherein said connecting tubes are coaxial, telescopically displaceable connecting tubes, said tubes corresponding in number, diameter, and placement to the number, diameter, and placement of said conduits in said pipeline sections and further comprising hydraulic servopistons mounted in said casing for moving said connecting tubes into engagement with said conduits in said pipeline section.

5. The coupling unit of claim 1 wherein the prestressing means comprises: four prestressing wedges, two wedges for each groove, said wedges being in the shape of cylindrical wedges, said wedges being activated by a hydraulic pressure means; and a self-locking mechanical means which allows said hydraulic pressure to be released while still locking said end flanges in said through running grooves.

6. The coupling unit of claim 1 wherein said connecting tubes are two coaxial displaceable tubes, one inside the other, and further comprising: a ring seal positioned outside of one tube and inside of the other tube for forming a seal between said two tubes; a conical sleeve surrounding both tubes for placing said ring seal under pressure thereby forming a tight seal between said two tubes.

7. The coupling unit of claim 1 wherein the locking means comprises:
   (a) a locking tube affixed to said casing, said locking tube having a groove extending circumferentially around the inside of said locking tube;
   (b) a locking bar affixed to said casing, said locking bar being slidable inside said locking tube;
   (c) a locking ring positioned on said locking bar and adapted to fit said locking tube groove, such that when said locking bar is slid inside said locking tube to align said locking ring with said locking tube groove, said locking ring releasably locks into said locking tube groove.

8. The coupling unit of claim 1 wherein said end flange of said adjacent pipeline sections has a through hole therein for the flow of a fluid between said pipeline sections and wherein one set of axially displaceable connecting tubes in said casing are similar in diameter and position to said through hole thereby allowing joinder of the through holes of adjacent pipeline sections.

* * * * *

UNITED STATES PATENT AND TRADEMARK OFFICE
CERTIFICATE OF CORRECTION

PATENT NO. : 4,696,453
DATED : September 29, 1987
INVENTOR(S) : Edgar Furuholt et al.

It is certified that error appears in the above-identified patent and that said Letters Patent is hereby corrected as shown below:

Column 6, line 56, change "D - D" to --D - $\Delta$D--.

Column 6, line 66, change "D - D" to --D - $\Delta$D--.

Column 7, line 5, change "connectirg" to --connecting--.

Column 7, line 8, change "($D_1$ - D)" to --($D_1$ - $\Delta$D)--.

Column 7, line 17, after the word "by", change "D" to --$\Delta$D--.

Column 7, line 33, change "pcsition" to --position--.

Column 7, line 35, change "rode 53" to --rod 53--.

Claim 1, line 3, change "sectons" to --sections--.

Claim 1, line 4, change "Pipeline" to --pipeline--.

Claim 3, line 3, change "right-angle" to --right-angled--.

Signed and Sealed this

Seventeenth Day of May, 1988

Attest:

DONALD J. QUIGG

*Attesting Officer*  *Commissioner of Patents and Trademarks*